United States Patent Office 3,613,487
Patented Oct. 19, 1971

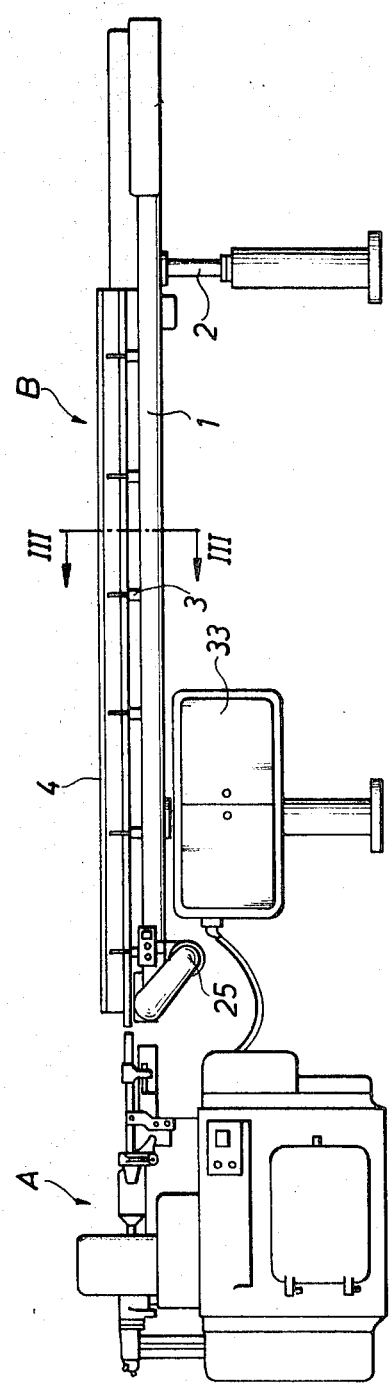
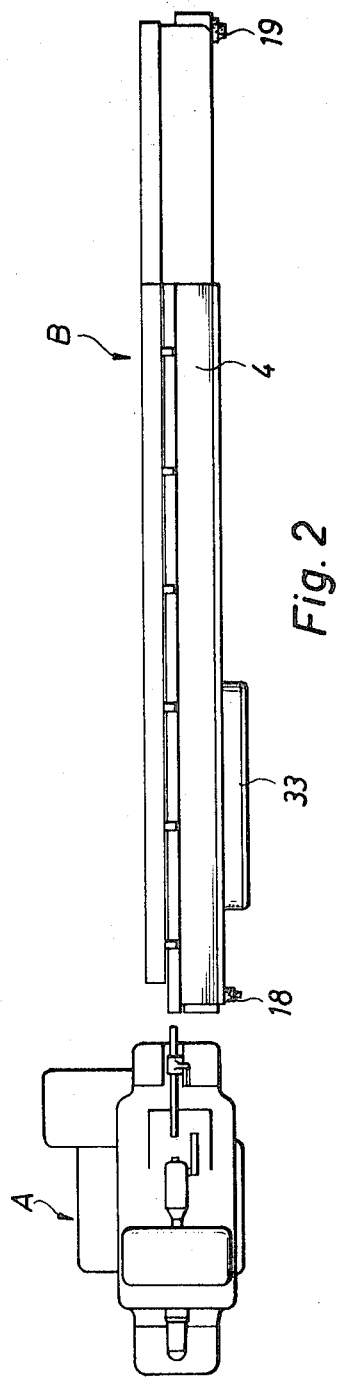

3,613,487
FEEDING APPARATUS FOR ROD STOCK FOR A MACHINE TOOL
Johannes Werkmeister, Reichenbach (Fils), and Holger Scheler, Faurndau, Germany, assignors to Firma Traub Vertriebsgesellschaft mbH., Reichenbach (Fils), Germany
Filed Mar. 3, 1969, Ser. No. 803,614
Int. Cl. B23b 13/00
U.S. Cl. 82—2.7                    8 Claims

ABSTRACT OF THE DISCLOSURE

An apparatus for feeding rods of different diameters in their axial direction to a machine tool, for example, to an automatic lathe by sliding the rods of one diameter by means of a feed rod along a feed channel in a guide rail which is clamped in a fixed position to parts of the stationary frame of the apparatus, but may be easily and quickly removed therefrom to be replaced by a similar guide rail with a feed channel for rods of a different diameter. The feed channel is open at its upper side which is normally covered by a cover bar which may be pivoted off this side to permit another rod of the same diameter to be inserted into the empty feed channel after the previous rod has been consumed and the feed rod has been withdrawn from the channel. The feed rod and the means for moving and guiding it may be adjusted to different levels in accordance with the width of the feed channel and the diameter of the rods to be fed.

---

The present invention relates to an apparatus for feeding rod stock or other rod-shaped workpieces of a considerable length to a machine tool, for example, an automatic lathe.

In machine tools the problem frequently occurs that rod stock or other rod-shaped workpieces of a considerable length are to be machined under identical operating conditions, even though they are of different diameters. For this purpose it has been proposed to guide the workpiece merely in the machine tool itself by varying the effective diameter of the spindle bore of the machine, for example, by inserting therein a tube of an inner diameter in accordance with the diameter of the particular workpiece to be machined, while the remainder of the workpiece which might project for a great distance from the machine was practically unguided. In order to overcome the disadvantages of such guide means, it has been proposed to provide a special feeding apparatus which is adjustable to rod stock and the like of different diameters so as to feed the same to a machine tool in accordance with the machining axis of the latter, for example, the axis of the spindle bore of this machine. Such a feeding apparatus consisted, for example, of a revolver-like arrangement of a plurality of guide tubes of different inner diameters in accordance with the different outer diameters of the rod stock which might have to be machined. Such a mechanism is, however, very complicated and expensive.

It is an object of the present invention to provide an apparatus for feeding rod stock or other rod-shaped workpieces of a considerable length and different diameters to a machine tool, for example, to an automatic lathe, which apparatus may be adjusted very easily and quickly so that the axes of workpieces of different diameters will coincide with the machining axis of the machine tool.

For attaining this object, the present invention provides a feeding apparatus which comprises a guide rail containing a horizontal guide or feed channel which is open at its upper side for receiving a rod to be fed and has a width substantially in accordance with the diameter of the rod, and a cover bar which is adapted to be moved so as to cover and uncover the open upper side of the feed channel. According to the invention, this guide rail containing the feed channel is mounted on a stationary part of the feeding apparatus by suitable securing means, preferably in the form of a clamping device, which may be easily released so that, when the cover bar is removed from the upper side of the guide rail, this rail may be easily and quickly removed from the apparatus and replaced by another guide rail with a feed channel for receiving rod stock or the like of a different diameter. This easy exchangeability of the guide rail permits the feeding apparatus to be employed very economically even though each of several series of rods or the like of different diameters which are to be fed to the machine tool only consists of a relatively small number of rods of the same diameter.

More specifically, it is a feature of the invention to provide a stationary supporting surface upon which the required guide rail may be placed and one lateral side of which has one or more upwardly projecting stop flanges, and to provide two or more clamping screws which are inclined at such an angle to the supporting surface that, when tightened against the other lateral side of the guide rail, they insure that the guide rail will always be clamped tightly and uniformly upon the supporting surface and against the lateral stop flange or flanges. This supporting and clamping device for the guide rail is of such a simple design that it may be very easily and quickly operated and will remain fully reliable for a great length of time. This supporting and clamping device is also designed so as only to act upon the lower part of the respective guide rail and to leave the greatest part of its height freely accessible for its easy manipulation.

Another feature of the invention consists in the provision of a feed rod which is slidable horizontally along the feed channel within the guide rail, of a mechanism outside of the guide rail for guiding this feed rod accurately in the axial direction of the feed channel, and of simple means for adjusting this guide mechanism in a vertical direction so that the longitudinal axis of the feed rod employed will coincide with the axis of the feed channel of one of several similar guide rails for rod stock of different diameters.

According to a very simple embodiment of the invention, this guide mechanism for the feed rod is slidably adjustable on vertical posts to different levels and adapted to be easily locked on these posts at the desired level, and it preferably comprises a plurality of supporting rollers which are rotatably mounted on a rail which is adjustable on the mentioned posts.

These as well as numerous additional features and advantages of the present invention will become further apparent from the following detailed description thereof which is to be read with reference to the accompanying diagrammatic drawings, in which—

FIG. 1 shows a side view of the feeding apparatus according to the invention together with an automatic lathe;

FIG. 2 shows a top view of the apparatus according to FIG. 1;

FIG. 3 shows an enlarged cross section of the feeding apparatus which is taken along the line III—III of FIG. 1; while

Figure 3:
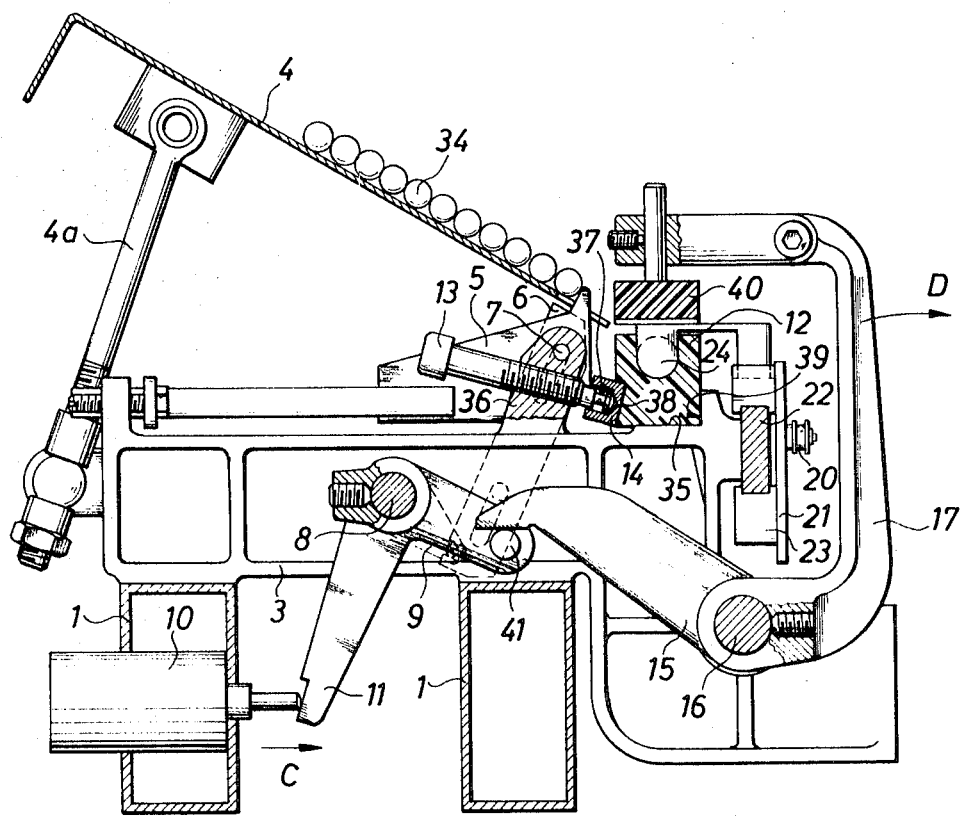
Figure 4:
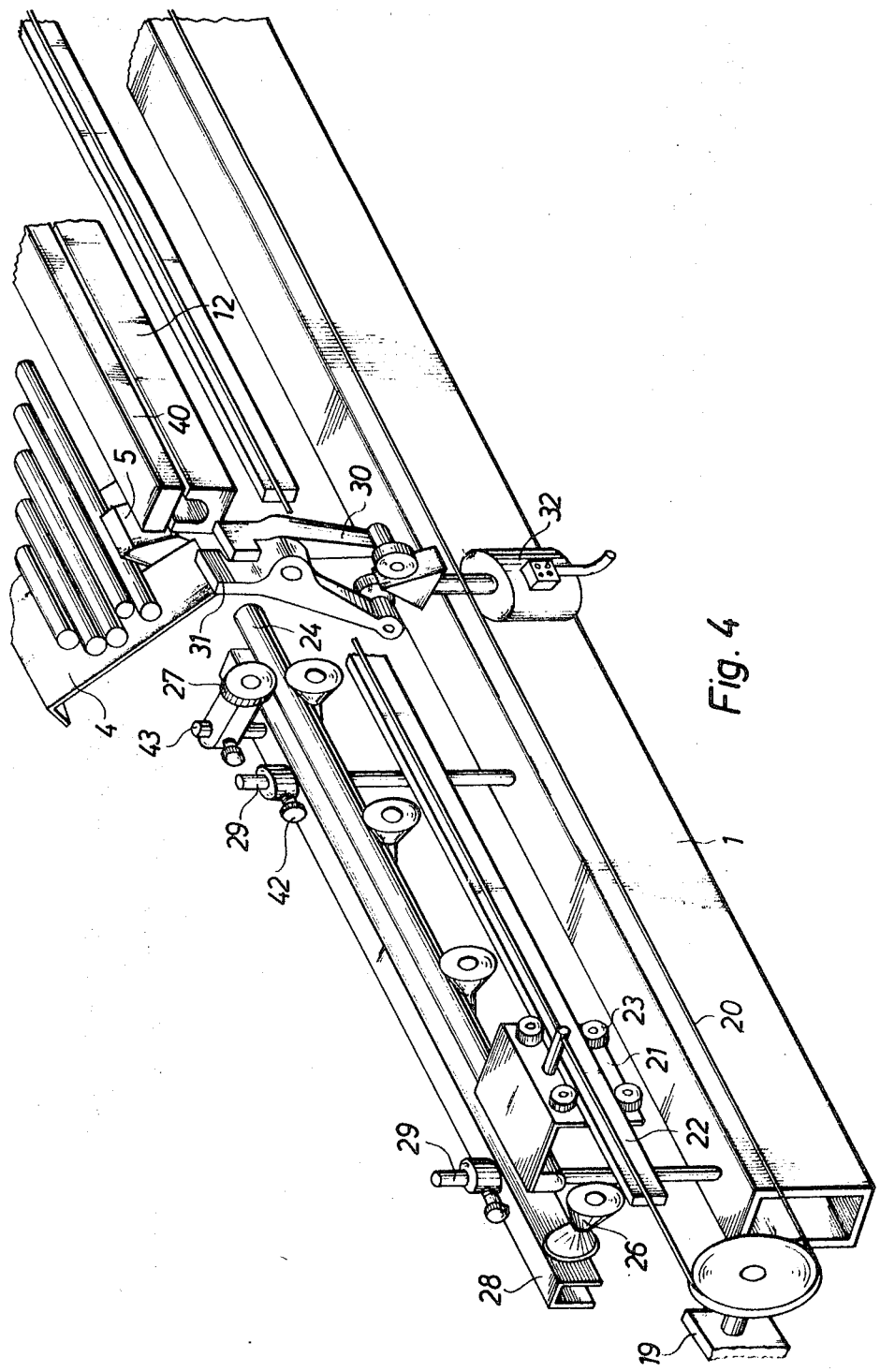
FIG. 4 shows a perspective view of a port of the feeding apparatus from which some elements are omitted for greater clarity of the illustration.

In the drawings, the feeding apparatus B according to the invention is illustrated in connection with a single-spindle automatic A of a conventional type. This feeding apparatus B comprises two longitudinal supporting beams 1 which are supported on vertical feet 2 and are connected to each other by bearing brackets 3, as shown particularly in FIG. 3. On these bearing brackets 3 a magazine or feed plate 4 is pivotably mounted which is adjustable to different fixed inclinations by means of setscrews 4a which, in turn, are pivotably connected to the bearing brackets 3 and also to the magazine plate 4. The lower end of magazine plate 4 is provided with recesses through which the upper ends of stop members 5 project above the plane of the magazine plate 4. These stop members 5 are adjustable in the direction parallel to the upper surfaces of the supporting beams 1 and serve as stops for preventing longer pieces of rod stock or other rod-shaped workpieces 34 from rolling off the magazine plate 4. On one side of these stop members 5 two or more slide members 6 are provided which are movable substantially vertically to the plane of the magazine plate 4 through the same or other recesses in the lower end of this plate. Each of these slide members 6 is guided on a pin which extends through a slot in slide member 6. These slide members 6 are designed and guided so as to be able to lift the rod 34 which abuts against the stop members 5 over the latter. For this purpose, each slide member 6 may be shifted in its longitudinal direction by a lever 9 which is rigidly connected to a control shaft 8 and engages into a recess in the lower end of slide member 6. Control shaft 8 may be turned about its axis when an electromagnet 10 is energized and the armature of this magnet then acts upon one arm of a bell crank 11 which is likewise secured to shaft 8.

Adjacent to the lower end of the magazine plate 4 and parallel to the upper surfaces of the supporting beams 1 a guide rail 12 is mounted which has a longitudinal feed channel in its upper side and rests on a supporting surface 35 of the bearing bracket 3 and abuts against a vertical shoulder 39 of bracket 3. Bearing bracket 3 is provided with at least one upward projection 36 which carries the pin 7 and has a tapped bore through which a clamping screw 13 is screwed for clamping the guide rail 12 in a fixed position. For this purpose, the end of each screw 13 facing the guide rail 12 which is provided with an annular groove is inserted into and rotatable in a socket hole in a pressure-transmitting shoe or member 14 and normally prevented from being separated from the latter by means of a transverse pin 37 which is inserted into the member 14 and into the annular groove of screw 13. Under the pressure of screws 13, members 14 are pressed against a surface 38 of guide rail 12 which extends at a right angle to the axes of screws 13 and forms one side of a triangle the two other sides of which are determined by the supporting surface 35 and the stop shoulder or shoulders 39.

The open upper side of guide rail 12 is covered by a flat bar 40 which is mounted on two or more levers 17 which are rigidly connected to a control shaft 16 which is rotatable back and forth and mounted in bearings, not shown, and carries at least one other lever 15 which is likewise rigidly connected to shaft 16. The free end of this lever 15 engages upon the upper side of a pin 41 on the other arm of bell crank 11 so that, when magnet 10 is energized and its armature is shifted in the direction of the arrow C, levers 17 will be pivoted in the direction of the arrow D. When in its normal covering position, as shown in FIG. 3, the lower surface of bar 40 will be spaced at a small distance from the upper surface of guide rail 12.

The opposite ends of one of the supporting beams 1 carry brackets 18 and 19 on which sprocket wheels are rotatably mounted which are connected by an endless chain 20. This chain 20 is connected to a carriage 21 which is movable by means of rollers 23 along a rail 22 parallel to the upper surface of the supporting frames 1 and to pass through the narrow gap between guide rail 12 and cover bar 40. Carriage 24 is removably secured to one end of a feed rod 24 which is adapted to slide into and along the feed channel in the guide rail 12. For driving one of the sprocket wheels carrying the chain 20 and for thus also driving the carriage 21 together with feed rod 24 an electric motor 25 is provided. Outside of the feed channel in guide rail 12 feed rod 24 is guided on supporting rollers 26 of a double-conical shape which are rotatably mounted on a supporting rail 28. This supporting rail 28 is vertically adjustable on posts 29 and adapted to be locked at the desired level by means of setscrews 42. In this manner it is possible to adjust the level of the supporting rail 28 in accordance with the diameter of the feed rod 24 which, in turn, depends upon the diameter of the rod-shaped workpieces 34 and the corresponding width of the feed channel in guide rail 12. If necessary, rail 22 may also be adjusted in the vertical direction by suitable means, not shown in the drawings.

The supporting rail 28 carries on its upper side a short post 43 on which a guide or hold-down roller 27 is rotatably mounted which is adapted to prevent the feed rod 24 from being lifted off the supporting rollers 26 and may be adjusted on the post 43 to the elevation which is in accordance with the thickness of the particular feed rod 24 which is to be used.

In the area between the adjacent ends of the supporting rail 28 and the guide rail 12 a pair of tongs 30 is provided one arm of which is rigidly secured to one of the supporting beams 1, while the other arm may be pivoted by an electromagnet 32, the armature of which carries a cam member which engages with a roller on the lower end of the pivotable tong arm. The inner sides of the jaws 31 of tongs 30 form flat surfaces which, when the magnet 32 is energized, clamp the useless remainder of a rod 34 in a fixed position which is connected to the feed rail 24 by a collet, not shown, which is provided on the front end of the feed rod. The electric-control means for the operation of the apparatus according to the invention are installed in a control cabinet 33.

The operation of the apparatus is as follows: A rod 34 which has been inserted into the guide channel in guide rail 12 is fed by the feed rod 24 toward the machine tool in steps as required by the work program of this machine. When this rod 34 has been consumed to such an extent that the remainder will no longer be sufficient for the next following operation, a limit switch, not shown, is actuated which switches off the machine tool at the end of the current operation. The operation of this limit switch also causes the remainder of the workpiece to be released from the machine tool.

During a short stopping period of the machine tool which is adjustable by a timing relay, the feed rod 24 together with the useless remainder of the rod-shaped workpiece 34 which is clamped by the collet on the feed rod are withdrawn from the machine tool and the guide rail 12 until this remainder can be gripped by the jaws 31 of tongs 30 by the actuation of the magnet 32 and will then be stopped by the tongs. Feed rod 24 is then withdrawn from this remainder and moved back to its rear end position. During this time, tongs 30 are opened so that the remainder of the workpiece will fall out of the tongs.

Magnet 10 is then energized and pivots the bell crank 11 and thereby turns the shaft 8 about its axis. Bell crank 11 then, in turn, pivots the lever 15 about the axis of shaft 16, whereby levers 17 are likewise pivoted and lift the cover bar 40 off the guide rail 12, while at the same time the levers 9 on shaft 8 lift the slide members 6 so that the rod 34 which abuts against the stop members 5 is lifted over the latter and then drops by its own weight into the feed channel in guide bar 12. When the magnet 10 is then switched off, the cover bar 40 is pivoted back to its normal position above the guide bar 12 and slide members 6 are likewise returned to their initial position. Magnet 32 is then again energized so that tongs 30 grip a part near the rear end of the rod 34 which has thus been newly inserted into the feed channel of guide bar 12.

Motor 25 is then started to move the feed rod 24 in the forward direction until the collet (not shown) on the front end of the feed rod is pushed over and grips the rear end of rod 34 which is held by the tongs 30. The forward movement of motor 25 and feed rod 24 is then stopped temporarily by a timing relay while magnet 32 is deenergized so that tongs 30 will be opened. When the motor 25 is then again started, feed rod 24 moves rod 34 forwardly until its front end reaches a control lever, limit switch or the like, not shown, which is mounted near the front bearing bracket 18. This actuates a feed control mechanism (likewise not shown) which determines the length of the further forward movement of rod 34 toward and into the machine tool A until the front end of rod 34 has passed through a collet of this machine A and for a short distance beyond a cutting-off tool of this machine. Feed motor 25 is then stopped by the control mechanism of the machine tool A and the front end of rod 34 is cut off. The further feeding movement of rod 34 by feed rod 24 is then controlled by the control mechanism of the machine tool A in accordance with the following operations of the latter.

If rod stock 34 of another diameter is to be machined, guide rail 12 is exchanged for another, the feed channel of which has a width substantially in accordance with the diameter of the new rod stock. For this purpose, cover bar 40 is pivoted off the empty guide rail 12 by the actuation of magnet 10, clamping screws 13 are then loosened, and guide rail 12 is manually removed and replaced by the other guide rail. This new guide rail 12 is then clamped in a fixed position by being pressed by the clamping screws 13 firmly against the supporting surface 35 and the stop shoulder or shoulders 39.

Feed rod 24 including its collet must then also be changed so as to be substantially in accordance with the diameter of the new rod stock 34 and the width of the feed channel in guide rail 12. Feed rod 24 is for this purpose removably connected to carriage 21 in a very simple manner, for example, by means of one or more setscrews. Since the new feed rod 24 must extend coaxially to the spindle axis of the machine tool A, setscrews 42 are loosened on posts 29 and the supporting rail 28 carrying the rollers 26 is then adjusted to the proper level and secured on posts 29 by tightening the setscrews 42. The upper guide roller 27 is adjusted accordingly on its post 43.

The apparatus according to the invention is made of such a simple design that even an untrained worker may exchange the guide rail 12 and adjust the supporting rail 28 of guide rollers 26 and 27 and if necessary also the rail 22 for carriage 21 to the required levels.

Guide rail 12 and cover bar 40 are preferably made of a sound-absorbing material.

Although my invention has been illustrated and described with reference to the preferred embodiment thereof, I wish to have it understood that it is in no way limited to the details of such embodiment but is capable of numerous modifications within the scope of the appended claims.

Having thus fully disclosed my invention, what I claim is:

1. An apparatus for feeding rods or the like to a machine tool comprising a stationary frame, a stationary guide rail having a feed channel therein extending in the axial direction of said rail and having an open upper side and open ends and adapted to receive and guide by sliding engagement rods of a certain diameter to be fed to said machine tool, a supporting surface and at least one flange projecting upwardly from one lateral side of said surface and at an angle thereto sufficient to hold said guide rail against movement in a first lateral direction, said guide rail having a lower side and opposite lateral sides, said lower side and one of said lateral sides of said rail also extending at said angle to each other and adapted to engage upon said supporting surface and said flange, respectively, means for removably securing said guide rail in a fixed horizontal position on said frame so as to permit said rail to be easily and quickly exchanged for a similar guide rail having a feed channel for rods of a different diameter, said securing means comprising clamping screws operatively engaging said frame spaced from the other lateral side of said rail only to engage and hold said guide rail against movement in the second direction and to press said rail against said lateral flange in said first direction for frictional engagement with said flange, a cover bar covering said open upper side of said feed channel when one of said rods is inserted therein, and means carrying said cover bar for quickly removing the same from said upper side of said feed channel when one of said rods is to be inserted therein.

2. An apparatus as defined in claim 1, further comprising a feed rod adapted to slide in the axial direction into and along said feed channel, guide means outside of and spaced from one end of said guide rail for supporting and guiding said feed rod, and means for adjusting said guide means in a vertical direction so that the axis of said feed rod coincides with the axis of the feed channel of the particular guide rail mounted on said frame.

3. An apparatus as defined in claim 2, in which said adjusting means comprise vertical posts mounted on said frame and along which said guide means are adjustable to different elevations, and means for locking said guide means on said posts at the desired elevation.

4. An apparatus as defined in claim 3, in which said guide means comprise a rail extending transverse to the axes of said posts and being adjustable to different elevations along said posts, and a plurality of guide rollers rotatably mounted on said rail for supporting and guiding said feed rod.

5. An apparatus as defined in claim 4, in which said guide rollers comprise a plurality of lower rollers each rotatably mounted in a fixed position on said rail and adapted to engage with and support the lower side of said feed rod, and at least one upper roller adapted to engage with the upper side of said feed rod, and means for adjusting said upper roller to different elevations relative to the common horizontal plane in which said lower rollers are rotatably mounted on said rail.

6. An apparatus as defined in claim 1, wherein each of said clamping screws has an axis extending within said angle and adapted to engage upon said other lateral side of said rail so as to also press said rail tightly upon said supporting surface.

7. An apparatus as defined in claim 6, in which said other lateral side of said rail has a surface against which said clamping screws are adapted to press, said surface as seen in a cross section of said rail taken in a direction transverse to its longitudinal direction forming at least a part of one side of a triangle the two other sides of which are defined by said lower side and said first lateral side of said rail which are adapted to be pressed tightly by said screws upon said supporting surface and against said flange, respectively.

8. An apparatus as defined in claim 7 wherein is provided a shoe on each clamping screw rotatable with respect thereto and at least partially fitting within said triangle to prevent slippage upon tightening of said screws.

References Cited

UNITED STATES PATENTS

| | | | |
|---|---|---|---|
| 2,750,716 | 6/1956 | Sangster | 82—2.7X |
| 2,915,810 | 12/1959 | Tayor et al. | 82—2.7 |
| 3,131,587 | 5/1964 | Spohn et al. | 82—2.7 |
| 3,147,653 | 9/1964 | Jones, Jr. | 82—2.7 |
| 3,455,190 | 7/1969 | Dalik | 82—2.7 |
| 3,480,159 | 11/1969 | White, Jr., et al. | 82—2.7X |

HARRISON L. HINSON, Primary Examiner